(12) United States Patent
Carrillo

(10) Patent No.: US 12,272,978 B2
(45) Date of Patent: Apr. 8, 2025

(54) SOLAR POWERED CHARGER ASSEMBLY

(71) Applicant: Miguel Carrillo, Hereford, TX (US)

(72) Inventor: Miguel Carrillo, Hereford, TX (US)

( * ) Notice: Subject to any disclaimer, the term of this patent is extended or adjusted under 35 U.S.C. 154(b) by 663 days.

(21) Appl. No.: 17/570,852

(22) Filed: Jan. 7, 2022

(65) Prior Publication Data

US 2023/0223774 A1 Jul. 13, 2023

(51) Int. Cl.
*H02J 7/00* (2006.01)
*H02S 40/38* (2014.01)

(52) U.S. Cl.
CPC ........ *H02J 7/0045* (2013.01); *H02J 7/00036* (2020.01); *H02S 40/38* (2014.12); *H02J 2300/24* (2020.01)

(58) Field of Classification Search
CPC .... H02J 7/0045; H02J 7/0042; H02J 7/00036; H02S 40/38
USPC ................. 320/101, 103, 107, 113, 114, 115
See application file for complete search history.

(56) References Cited

U.S. PATENT DOCUMENTS

| | | | |
|---|---|---|---|
| 6,650,085 B2 | 11/2003 | Lau | |
| 7,026,541 B2 | 4/2006 | Heidrich | |
| 7,125,270 B2* | 10/2006 | Buck | H01M 50/244 439/352 |
| 8,111,034 B2 | 2/2012 | Fowler | |
| 8,786,254 B2* | 7/2014 | Ogura | H02J 7/0045 320/112 |
| 9,781,985 B2 | 10/2017 | Akin | |
| 10,666,055 B2* | 5/2020 | Garrity | H02J 50/10 |
| 11,190,036 B2* | 11/2021 | Hiratsuka | H02J 7/0048 |
| 2005/0162121 A1 | 7/2005 | Chan | |
| 2015/0171632 A1* | 6/2015 | Fry | H02J 7/0042 307/22 |
| 2023/0223775 A1* | 7/2023 | Carrillo | H02J 7/35 320/114 |
| 2024/0022097 A1* | 1/2024 | Self | H02J 7/0049 |

* cited by examiner

*Primary Examiner* — Richard V Muralidar

(57) ABSTRACT

A solar powered charger assembly for charging batteries for cordless tools includes a housing that has a charging slot being integrated into the housing to insertably receive a battery from a cordless tool. A charging battery is positioned within the housing and the charging battery is in electrical communication with the charging slot. The charging battery charges the battery of the cordless tool when the battery for the cordless tool is inserted into the charging slot. A plurality of solar panels is each electrically coupled to the housing such that each of the solar panels is exposed to sunlight. Each of the solar panels is in electrical communication with the charging battery for charging the charging battery.

8 Claims, 3 Drawing Sheets

SOLAR POWERED CHARGER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to charger devices and more particularly pertains to a new charger device for charging batteries for cordless tools. The device includes a housing and a plurality of solar panels that are distributed around the housing. The device includes a charging battery disposed in the housing that is charged by the solar panels and a charging slot recessed into the housing. The charging slot receives a battery from a cordless tool for charging the battery from the cordless tool.

(2) Description of Related Art Including Information Disclosed Under 37 CFR 1.97 and 1.98

The prior art relates to charger devices including a variety of charging devices that each at least includes a plurality of hinges panels, each having a solar panel disposed thereon, which can be positioned in a deployed position and which each includes a charging port for charging an electronic device. The prior art discloses a charging umbrella which has a plurality of solar panels disposed thereon and a charge port for charging an electronic device.

BRIEF SUMMARY OF THE INVENTION

An embodiment of the disclosure meets the needs presented above by generally comprising a housing that has a charging slot being integrated into the housing to insertably receive a battery from a cordless tool. A charging battery is positioned within the housing and the charging battery is in electrical communication with the charging slot. The charging battery charges the battery of the cordless tool when the battery for the cordless tool is inserted into the charging slot. A plurality of solar panels is each electrically coupled to the housing such that each of the solar panels is exposed to sunlight. Each of the solar panels is in electrical communication with the charging battery for charging the charging battery.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
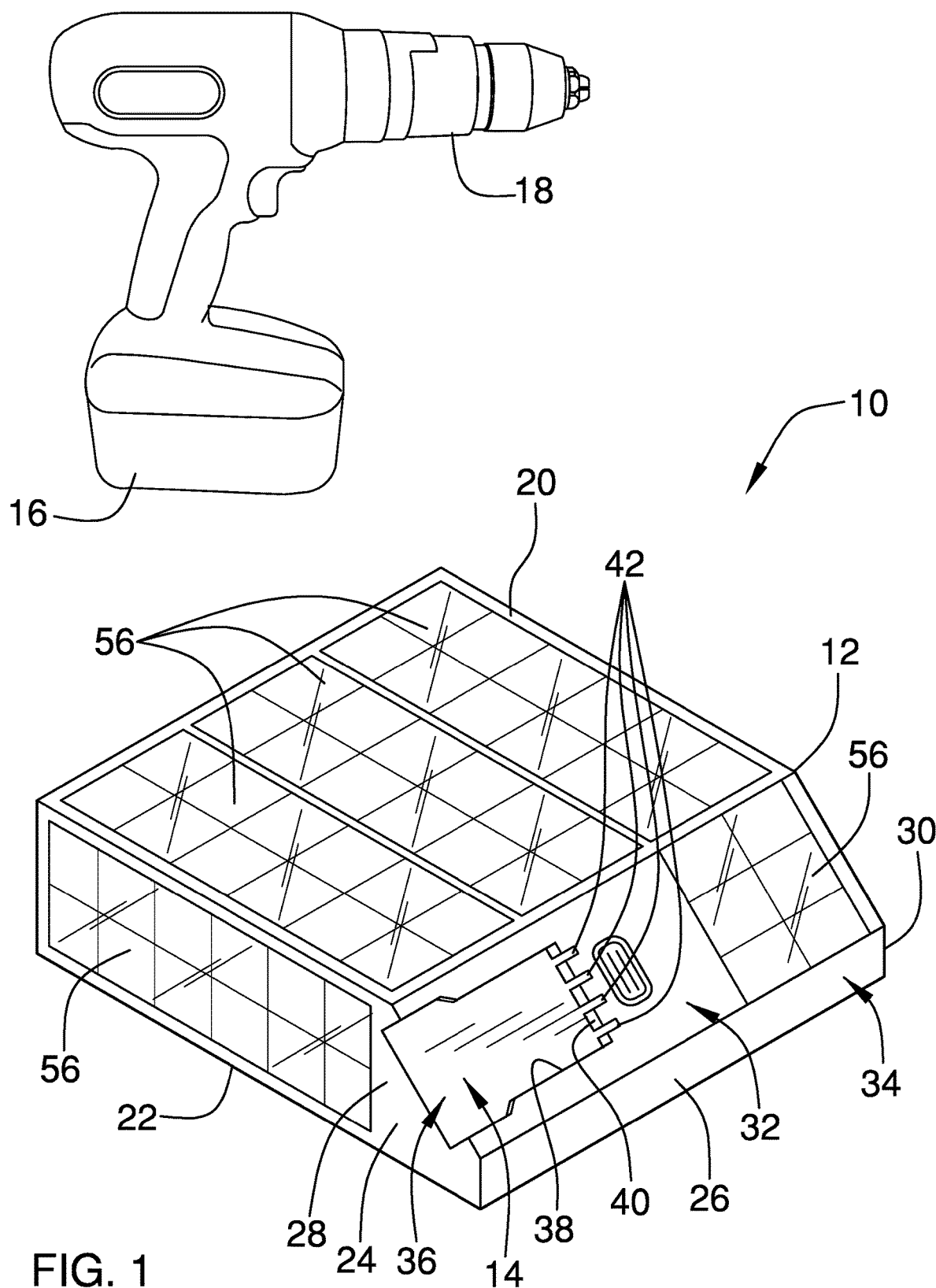
FIG. 1 is a front perspective view of a solar powered charger assembly according to an embodiment of the disclosure.
Figure 2:
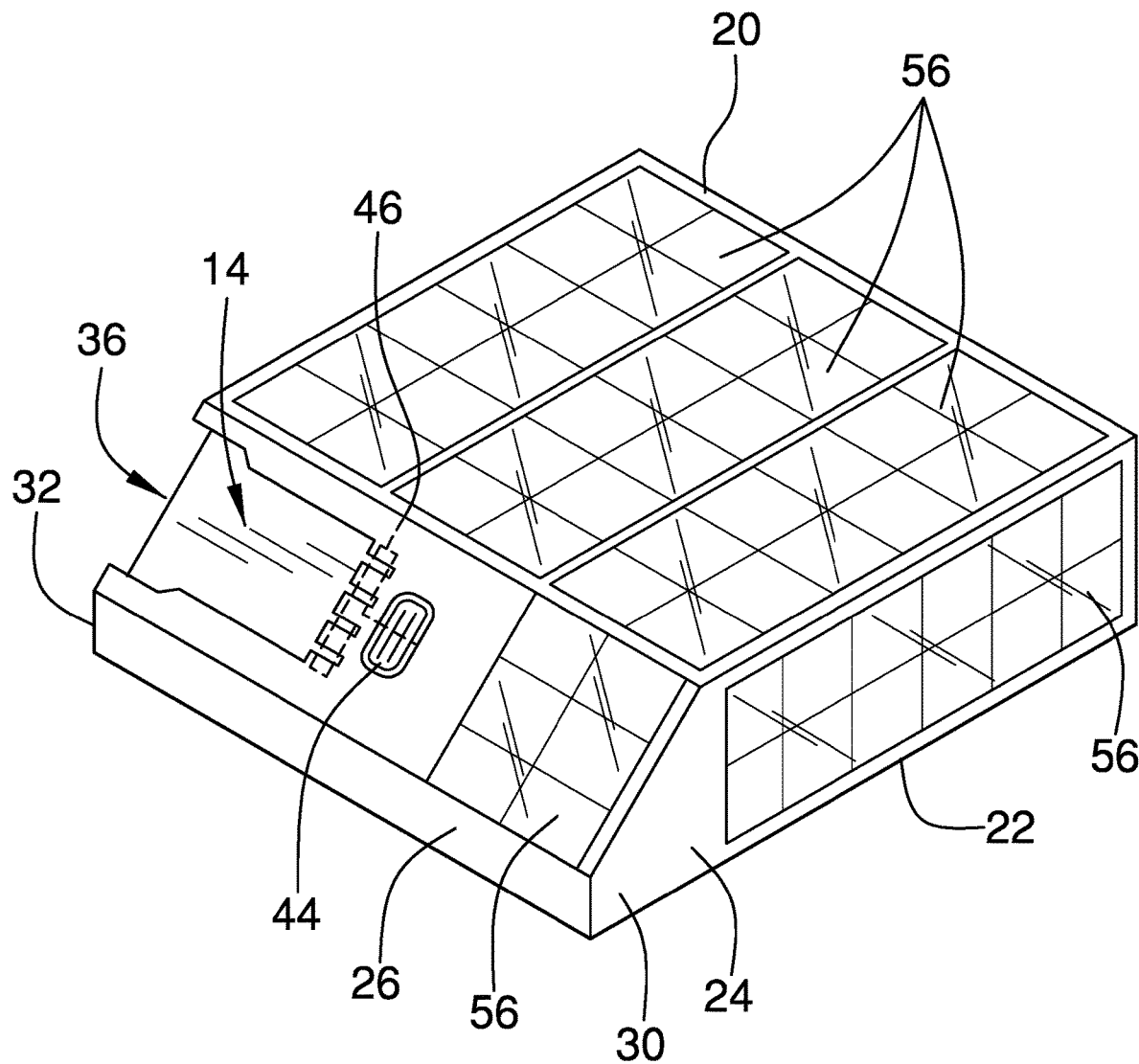
FIG. 2 is a top perspective view of an embodiment of the disclosure.
Figure 3:
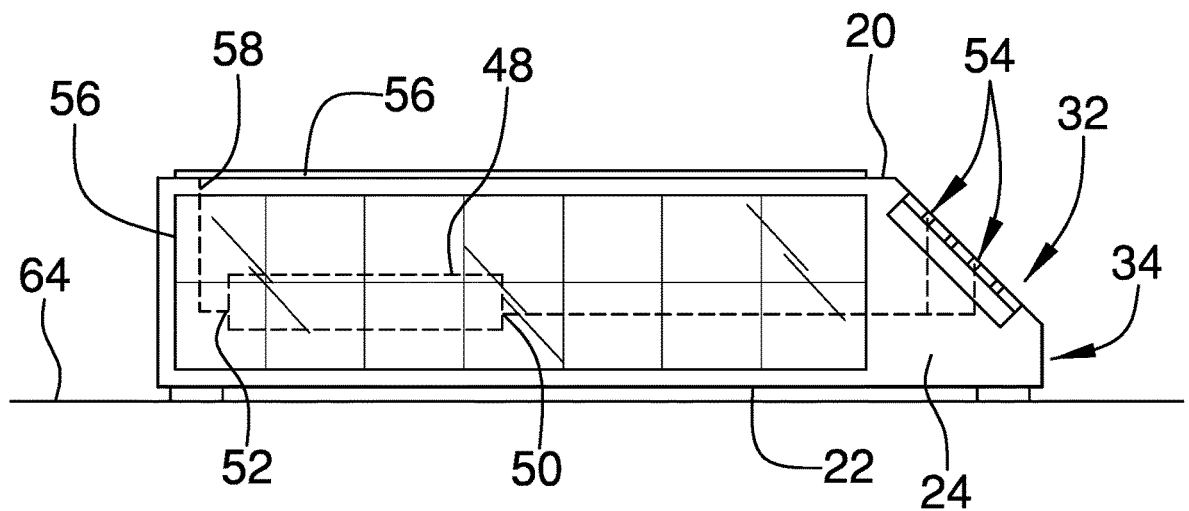
FIG. 3 is a right side view of an embodiment of the disclosure.
Figure 4:
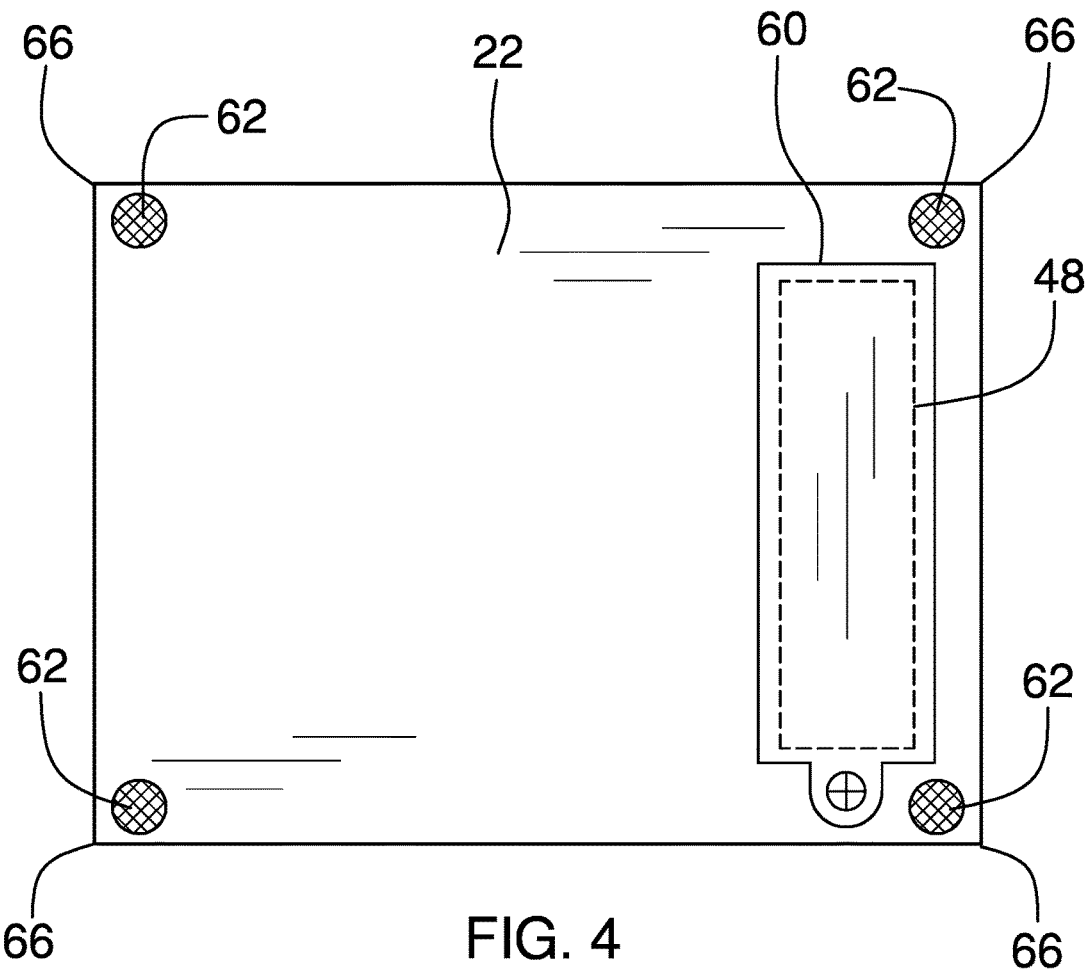
FIG. 4 is a bottom view of an embodiment of the disclosure.

With reference now to the drawings, and in particular to FIGS. 1 through 4 thereof, a new charger device embodying the principles and concepts of an embodiment of the disclosure and generally designated by the reference numeral 10 will be described.

As best illustrated in FIGS. 1 through 4, the solar powered charger assembly 10 generally comprises a housing 12 that has a charging slot 14 which is integrated into the housing 12 to insertably receive a battery 16 from a cordless tool 18. The cordless tool 18 may be a cordless drill, a cordless saw or any other type of cordless tool with a rechargeable battery. The housing 12 has a top wall 20, a bottom wall 22 and a perimeter wall 24 extending between the top wall 20 and the bottom wall 22, and the perimeter wall 24 has a front side 26, a first lateral side 28 and a second lateral side 30. The front side 26 has a sloped face 32 and a vertical face 34, and the sloped face 32 angles inwardly between the vertical face 34 and the top wall 20.

The charging slot 14 is recessed into the sloped face 32 and the charging slot 14 intersects the first lateral side 28 of the perimeter wall 24 to define an entry 36 into the charging slot 14 which is located on the first lateral side 28. The charging slot 14 has a bounding surface 38 and the bounding surface 38 has a first sidelong side 40 which is spaced from the first lateral side 28 of the perimeter wall 24. The first sidelong side 40 has a plurality of notches 42 integrated into the first sidelong side 40 and each of the notches 42 accommodates structural features of the battery 16 from the cordless tool 18. A release button 44 is movably integrated into the sloped face 32 of the side of the perimeter wall 24 of the housing 12 and the release button 44 is in mechanical communication with an engagement 46 which is disposed in the charging slot 14. The engagement 46 is actuated into a releasing condition when the release button 44 is depressed to disengage the battery 16 thereby facilitating the battery 16 to be removed from the charging slot 14.

A charging battery 48 is provided and the charging battery 48 is positioned within the housing 12. The charging battery 48 is in electrical communication with the charging slot 14 to charge the battery 16 of the cordless tool 18 when the battery 16 for the cordless tool 18 is inserted into the charging slot 14. The charging battery 48 has an output 50 and an input 52, and the output 50 is electrically coupled to a plurality of charge contacts 54 in the charging slot 14. Additionally, each of the charge contacts 54 is in electrical communication with the battery 16 of the cordless tool 18 when the battery 16 of the cordless tool 18 is inserted into the charging slot 14.

A plurality of solar panels 56 is provided and each of the solar panels 56 is electrically coupled to the housing 12 such that each of the solar panels 56 is exposed to sunlight. Each of the solar panels 56 is in electrical communication with the charging battery 48 for charging the charging battery 48. Furthermore, each of the solar panels 56 is positioned on a respective one of the top wall 20, the first lateral side 28 of the perimeter wall 24, the second lateral side 30 of the perimeter wall 24 and the sloped face 32 of the front side 26 of the perimeter wall 24. Each of the solar panels 56 has an output 58 and the output 58 of each of the solar panels 56 is electrically coupled to the input 52 of the charging battery 48.

A battery cover 60 is removably attached to the bottom wall 22 of the housing 12. The charging battery 48 is positioned beneath the battery cover 60 for facilitating the charging battery 48 to be removed from the housing 12. A plurality of feet 62 is each coupled to the bottom wall 22 of the housing 12 to support the housing 12 on a support surface 64. Each of the feet 62 is aligned with a respective one of four corners 66 of the bottom wall 22.

In use, the housing 12 is positioned in a location that facilitates the solar panels 56 to be exposed to sunlight. The battery 16 for the cordless tool 18 is inserted into the charging slot 14 to charge the battery 16 for the cordless tool 18. In this way the battery 16 for the cordless tool 18 can be recharged in a remote location that does not have electrical power available. The release button 44 is depressed to release the battery 16 from the charging slot 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A solar powered charger assembly for charging batteries for cordless tools, said assembly comprising:
a housing having a charging slot being integrated into said housing wherein said charging slot is configured to insertably receive a battery from a cordless tool, said housing having a top wall, a bottom wall and a perimeter wall extending between said top wall and said bottom wall, said perimeter wall having a front side, a first lateral side and a second lateral side, said front side having a sloped face and a vertical face, said sloped face angling inwardly between said vertical face and said top wall;
a charging battery being positioned within said housing, said charging battery being in electrical communication with said charging slot wherein said charging battery is configured to charge the battery of the cordless tool when the battery for the cordless tool is inserted into said charging slot;
a plurality of solar panels, each of said solar panels being electrically coupled to said housing wherein each of said solar panels is configured to be exposed to sunlight, each of said solar panels being in electrical communication with said charging battery for charging said charging battery, said plurality of solar panels including top solar panels being positioned and exposed on an outer face of said top wall; and
said charging slot being recessed into said sloped face wherein said charging, said charging slot intersecting said first lateral side of said perimeter wall to define an entry into said charging slot being located on said first lateral side wherein said charging slot is positioned slanting away from said top wall wherein said charging slot is configured for positioning the battery engaged to said charging slot from inhibiting sunlight from accessing said top solar panels positioned on said top wall.

2. The assembly according to claim 1, wherein said charging slot has a bounding surface, said bounding surface having a first sidelong side being spaced from said first lateral side of said perimeter wall, said first sidelong side having a plurality of notches being integrated into said first sidelong side wherein each of said notches is configured to accommodate structural features of the battery from the cordless tool.

3. The assembly according to claim 2, further comprising a release button being movably integrated into said sloped face of said side of said perimeter wall of said housing, said release button being in mechanical communication with an engagement being disposed in said charging slot, said engagement being actuated into a releasing condition when said release button is depressed wherein said engagement is configured to disengage the battery thereby facilitating the battery to be removed from said charging slot.

4. The assembly according to claim 1, wherein said charging battery has an output and an input, said output being electrically coupled to a plurality of charge contacts in said charging slot wherein each of said charge contacts is configured to be in electrical communication with the battery of the cordless tool when the battery of the cordless tool is inserted into said charging slot.

5. The assembly according to claim 1, further comprising a battery cover being removably attached to said bottom wall of said housing, said charging battery being positioned beneath said battery cover for facilitating said charging battery to be removed from said housing.

6. The assembly according to claim 1, further comprising a plurality of feet, each of said feet being coupled to said bottom wall of said housing wherein each of said feet is configured to support said housing on a support surface, each of said feet being aligned with a respective one of four corners of said bottom wall.

7. A solar powered charger assembly for charging batteries for cordless tools, said assembly comprising:
- a housing having a charging slot being integrated into said housing wherein said charging slot is configured to insertably receive a battery from a cordless tool, said housing having a top wall, a bottom wall and a perimeter wall extending between said top wall and said bottom wall, said perimeter wall having a front side, a first lateral side and a second lateral side, said front side having a sloped face and a vertical face, said sloped face angling inwardly between said vertical face and said top wall, said charging slot being recessed into said sloped face, said charging slot intersecting said first lateral side of said perimeter wall to define an entry into said charging slot being located on said first lateral side, said charging slot having a bounding surface, said bounding surface having a first sidelong side being spaced from said first lateral side of said perimeter wall, said first sidelong side having a plurality of notches being integrated into said first sidelong side wherein each of said notches is configured to accommodate structural features of the battery from the cordless tool;
- a release button being movably integrated into said sloped face of said side of said perimeter wall of said housing, said release button being in mechanical communication with an engagement being disposed in said charging slot, said engagement being actuated into a releasing condition when said release button is depressed wherein said engagement is configured to disengage the battery thereby facilitating the battery to be removed from said charging slot;
- a charging battery being positioned within said housing, said charging battery being in electrical communication with said charging slot wherein said charging battery is configured to charge the battery of the cordless tool when the battery for the cordless tool is inserted into said charging slot, said charging battery having an output and an input, said output being electrically coupled to a plurality of charge contacts in said charging slot wherein each of said charge contacts is configured to be in electrical communication with the battery of the cordless tool when the battery of the cordless tool is inserted into said charging slot;
- a plurality of solar panels, each of said solar panels being electrically coupled to said housing wherein each of said solar panels is configured to be exposed to sunlight, each of said solar panels being in electrical communication with said charging battery for charging said charging battery, each of said solar panels being positioned on a respective one of said top wall, said first lateral side of said perimeter wall, said second lateral side of said perimeter wall and said sloped face of said front side of said perimeter wall, each of said solar panels having an output, said output of each of said solar panels being electrically coupled to said input of said charging battery;
- a battery cover being removably attached to said bottom wall of said housing, said charging battery being positioned beneath said battery cover for facilitating said charging battery to be removed from said housing; and a plurality of feet, each of said feet being coupled to said bottom wall of said housing wherein each of said feet is configured to support said housing on a support surface, each of said feet being aligned with a respective one of four corners of said bottom wall.

8. A solar powered charger system for charging batteries for cordless tools, said system comprising:
- a cordless tool having a battery;
- a housing having a charging slot being integrated into said housing to insertably receive said battery from said cordless tool, said housing having a top wall, a bottom wall and a perimeter wall extending between said top wall and said bottom wall, said perimeter wall having a front side, a first lateral side and a second lateral side, said front side having a sloped face and a vertical face, said sloped face angling inwardly between said vertical face and said top wall, said charging slot being recessed into said sloped face, said charging slot intersecting said first lateral side of said perimeter wall to define an entry into said charging slot being located on said first lateral side, said charging slot having a bounding surface, said bounding surface having a first sidelong side being spaced from said first lateral side of said perimeter wall, said first sidelong side having a plurality of notches being integrated into said first sidelong side to accommodate structural features of said battery from said cordless tool;
- a release button being movably integrated into said sloped face of said side of said perimeter wall of said housing, said release button being in mechanical communication with an engagement being disposed in said charging slot, said engagement being actuated into a releasing condition when said release button is depressed thereby facilitating said engagement to disengage said battery thereby facilitating said battery to be removed from said charging slot;
- a charging battery being positioned within said housing, said charging battery being in electrical communication with said charging slot to charge said battery of said cordless tool when said battery for said cordless tool is inserted into said charging slot, said charging battery having an output and an input, said output being electrically coupled to a plurality of charge contacts in said charging slot, each of said charge contacts being in electrical communication with said battery of said cordless tool when said battery of said cordless tool is inserted into said charging slot;
- a plurality of solar panels, each of said solar panels being electrically coupled to said housing wherein each of said solar panels is configured to be exposed to sunlight, each of said solar panels being in electrical communication with said charging battery for charging said charging battery, each of said solar panels being positioned on a respective one of said top wall, said first lateral side of said perimeter wall, said second lateral side of said perimeter wall and said sloped face of said front side of said perimeter wall, each of said solar panels having an output, said output of each of said solar panels being electrically coupled to said input of said charging battery;
- a battery cover being removably attached to said bottom wall of said housing, said charging battery being positioned beneath said battery cover for facilitating said charging battery to be removed from said housing; and a plurality of feet, each of said feet being coupled to said bottom wall of said housing wherein each of said feet is configured to support said housing on a support surface, each of said feet being aligned with a respective one of four corners of said bottom wall.

* * * * *